FIG. 1a.
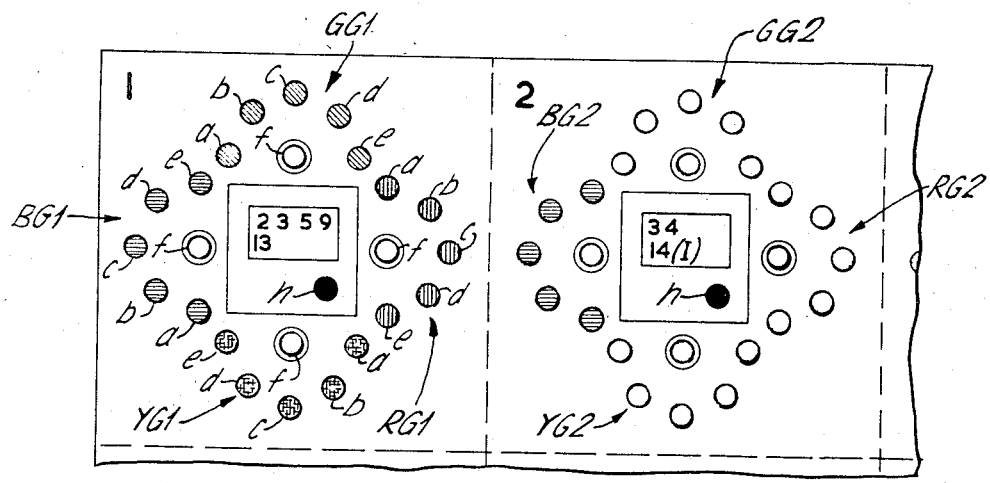
FIG. 1b.
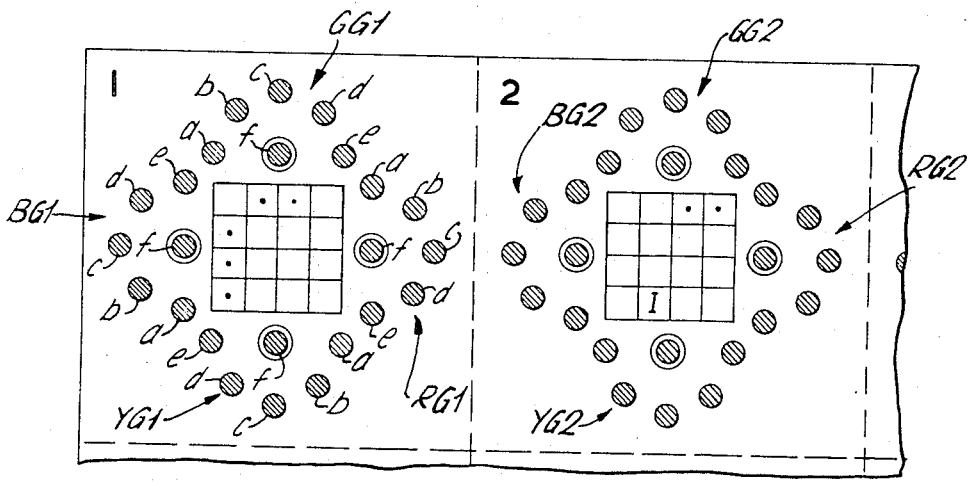
FIG. 4b
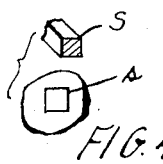
FIG. 4a
STEPHEN I. WARMAN
INVENTOR
ATTORNEY

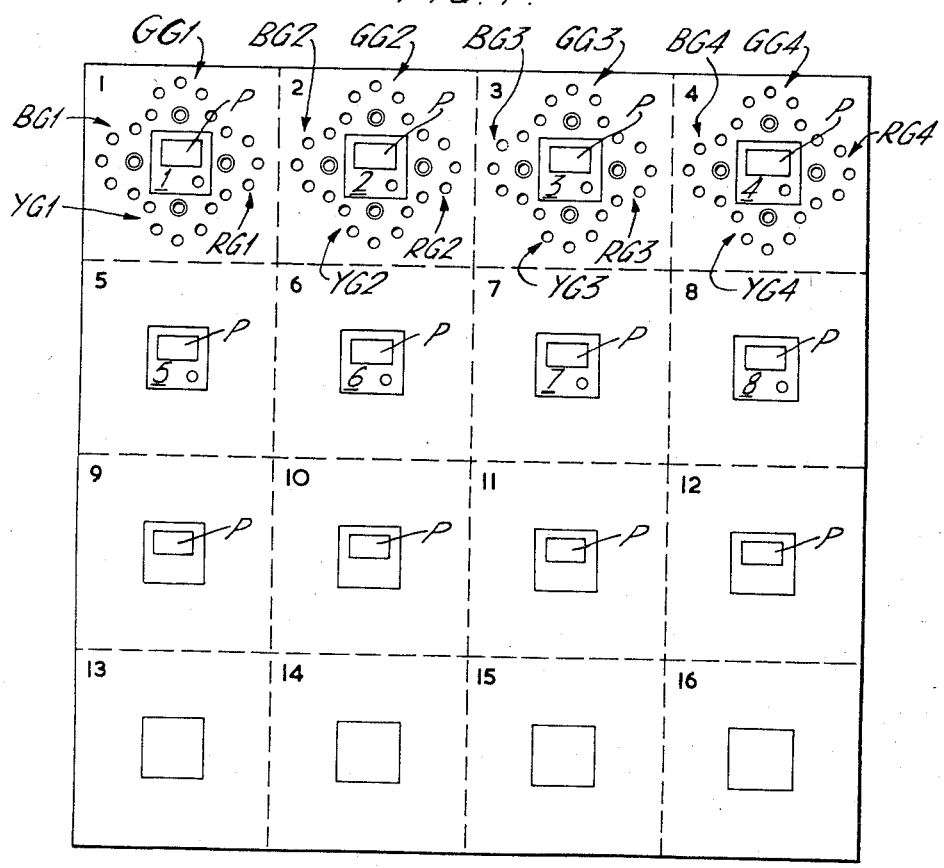

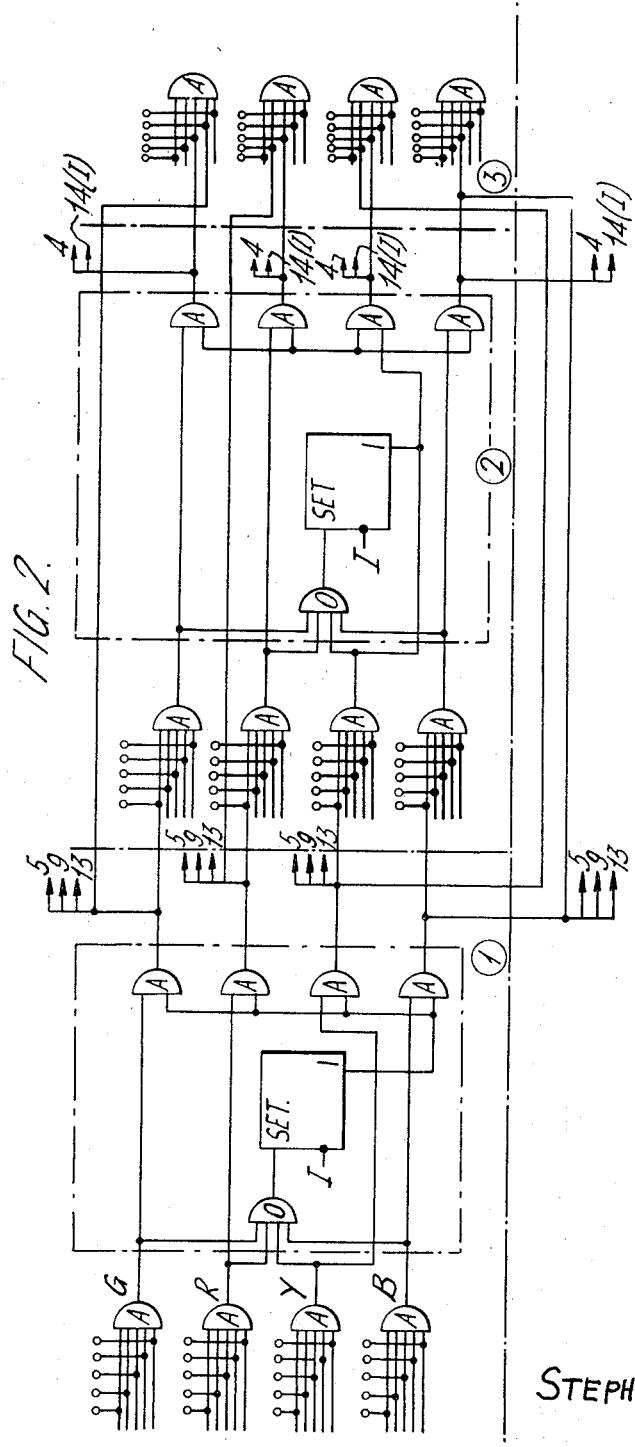

United States Patent Office 3,430,960
Patented Mar. 4, 1969

3,430,960
BOARD GAME APPARATUS FOR SIMULATING
COMPUTER OPERATION
Stephen Ivan Warman, London, England, assignor to Data Laboratories Limited, London, England, a British company
Filed June 14, 1965, Ser. No. 463,639
Claims priority, application Great Britain, June 12, 1964, 24,595/64
U.S. Cl. 273—131
Int. Cl. A63f 3/00
17 Claims

ABSTRACT OF THE DISCLOSURE

A game apparatus for simulating the operation of a computer, said apparatus comprising a playing board divided into a plurality of uniquely identified fields, each field representing a computer flip-flop with gate input terminals simulated by visually distinguishable groups of indicia. The apparatus further comprises groups of playing pieces to be associated with said indicia, the pieces of each group having visual characteristics matching those of one group of indicia. Each field on the playing board comprises a plurality of indicia matching the identification indicia on some of the other fields, whereby the play is directed from one field to one or more other fields, thereby simulating the progression of signals in a computer.

---

This invention relates to games to be played with a board and playing pieces, and its aim is to simulate in some degree the mode of operation of digital computer logical circuits.

In the game according to the invention, the board is marked off into fields which carry indicia to indicate a number of interrelated logic elements with gates, represented by groups of indicia, controlling such elements, and the pieces represent signals and are applied to the gate inputs by the players in turn.

The logic elements represented may be flip-flops, each associated with multi-input AND gates, one for each player; the first player to put pieces on all the inputs of one of his gates changes the state of the corresponding flip-flop (this is equivalent to an AND function) and "takes" such pieces of other players as may be on the inputs of their gates for the particular flip-flop. Each of the flip-flops carry indications which indiciate the further connection of the flip-flop and direct the player to further flip-flops. A player who has just taken, or occupied, the flip-flop, is to place his pieces on the inputs of the AND gates of these other flip-flops, as directed. Thus the pieces belonging to said first player are transferred according to a pre-arranged "programme" to his gates associated with other flip-flops: alternatively some at least of the pieces may be transferred at will to his other gates. The player may receive points, for example according to the number of other players' pieces which he takes, or according also to the number of flip-flops changed over.

Two forms of game according to the invention are illustrated in the accompanying drawings, wherein:

FIGURE 1 shows a plan of the board for playing the first form of game;

FIGURE 1a shows an enlargement of the top left hand corner of the board;

FIGURE 1b shows a variant of the FIGURE 1a;

FIGURE 2 is a flow diagram illustrating the computer simulated by the portion of the board shown in FIGURE 1a;

FIG. 4a shows a coacting recess and peg of square cross section; and

FIG. 4b shows a modification wherein the cross section is triangular.

Figure 3:
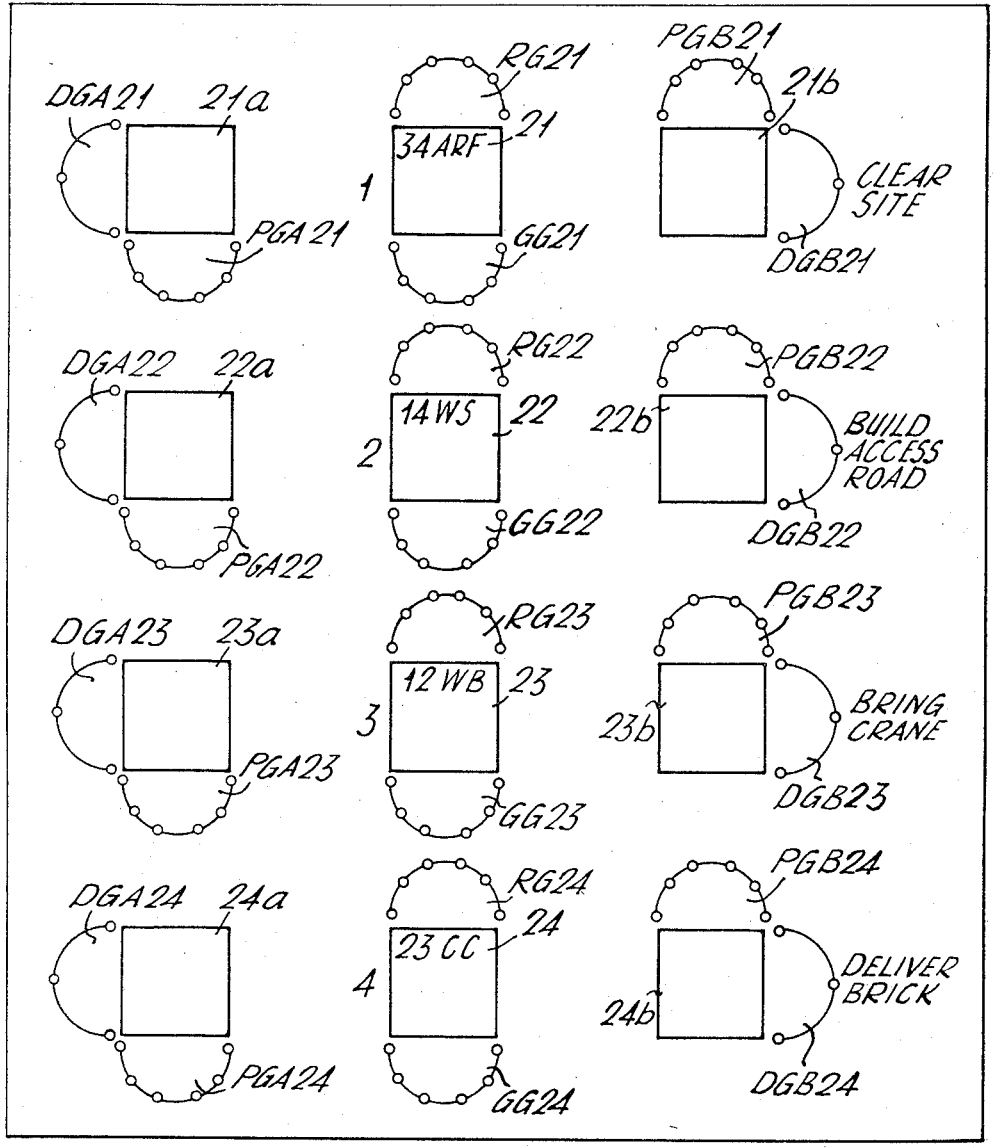
FIGURE 3 shows a plan of a board for playing the second form of game.

Referring to FIGURES 1 and 1a, the board is subdivided into a plurality of fields, for example 16, although any number may be used; the fields represent flip-flops and gates, and have indicia indicating their interconnection. These fields may be a series of squares. Within each field is a central region; 16 flip-flops numbered 1 to 16 are represented. Each field is further subdivided into peripheral regions; as shown, each flip-flop is associated with four AND gates designated respectively GG1, RG1, YG1, BG1 for the first flip-flop 1, GG2, RG2, YG2, BG2 for the second flip-flop 2, and so forth. Each AND gate is represented by five input indicia, for example holes $a$, $b$, $c$, $d$, $e$ adjacent a respective side of the square representing the corresponding flip-flop, each hole indicating one of the five inputs of the respective gate. Markers of various colours are provided, for example pegs fitting in holes $a$, $b$, etc. The holes $a$, $b$, $c$, $d$, $e$ of the gates GG1, GG2, GG3 and so on are all coloured green and a player having green pegs can put them in these holes. The holes for the gates RG1, RG2, RG3 and so on are all coloured red and a second player having red pegs can put them in these red holes. Similarly the holes for the gates YG1, YG2, YG3 and so on, and BG1, BG2, BG3 and so on are marked respectively, yellow and blue for the yellow and blue pegs of third and fourth players, respectively. Each player has a fixed number of pegs of one colour or shape only and, by the rules of the game, or according to the shape of the holes and the pegs, can only put them in the holes $a$, $b$, $c$, $d$, $e$ of the various gates which carry his colour or shape, respectively. The pegs each represent an electrical signal. FIG. 4a shows a square peg S and a matching hole $s$; FIG. 4b a triangular hole $t$.

An additional hole $f$ for accepting pegs of any one colour or shape is associated with each gate GG1, RG1, YG1, BG1, GG2, GG2, YG2, BG2, etc., to indicate when the respective flip-flop has been set.

A further hole $h$ may be associated with each flip-flop 1 to 16 to indicate that the respective flip-flop is inhibited. Each flip-flop 1 to 16 is marked with a program as shown by the numbers in the box P therein, representing the further progression of signals in the computer simulated by the game.

Before describing in detail how the game simulates a computer, it is desirable to explain the rules; thereafter the analogy with computer logic will be clear.

The game can be played by two, three or four players. At the start of the game a number of pegs, for example 5, of the different colours are set up in certain of the holes $a$ to $e$ of the gates GG1, RG1, YG4, and so forth. The placement of these pegs is, for example, determined by throws of dice, or a number of such placements may be printed on cards, one of which may be drawn at random, so that games need not all begin with the same arrangement. The players now each in turn take an additional peg and insert it in a hole $a$ to $e$ of a chosen colour in any field; choice of field depends entirely on the player. When a player has pegs on all the holes $a$ to $e$ of a particular gate, say GG1 (the "green" player has 5 green pegs on gate GG1), thus simulating a signal at all the inputs of the gate, then he "takes" and symbolically changes the state of the respective flip-flop 1 to SET; to symbolize this, he places another green peg in the hole $f$. The five remaining green pegs, that is, those which are in the holes $a$ to $e$ of the green gate GG1, are now distributed by the "green" player according to his choice, and as limited by the direction of box P to holes of the green colour, in fields as determined by the instructions denoted by the "programme" in the box P of the "taken," or SET, flip-flop 1. Thus (referring to FIG.

1a) the player will move pegs to gates GG2, GG3, GG5, GG9, and GG13. The player also takes any pegs in any of the holes of the gates RG1, BG1, YG1.

If the "programme" requires that a particular flip-flop should be inhibited (as by the symbol 14(I)) then a peg is moved to the hole $h$ of the flip-flop designated. Thereafter, whatever pegs there may at any time be on the gates of this flip-flop, its state cannot be changed; however if a flip-flop has already changed state, its subsequent inhibition is without significance, since in any case after change of state of a particular flip-flop and consequent movement of pegs in accordance with the "programme," no pegs added to its AND gates will have any value.

FIGURE 2 shows a flow diagram of the part of the computer which is simulated by the portion of the board shown in FIGURE 1a. The symbols there shown will be understood by those familiar with computers. Letters G, R, Y, B identify the respective gates GG1, RG1, YG1, BG1, etc. Each of the flip-flops, of which flip-flops 1 and 2 only are shown complete, having SET, INHIBIT and output terminals, is associated with OR and AND gates (marked "O" and "A" respectively) in the manner shown to ensure that when the flip-flop is set by, say, the "green" gate it transmits signals only to the "green" gates of the particular flip-flops designated by the "programme."

As can be seen from FIGS. 1a, 1b, flip-flop No. 1, when set, interconnects with one input to flip-flops 2, 3, 5, 9 and 13; this is also evident from the connections of FIG. 2, in which each of the outputs of flip-flop 1 connects to one input of one of the AND-gates of flip-flops 2, 3, 5, 9 and 13, the connections to 5, 9 and 13 being indicated by the lines with the arrows marked 5, 9, and 13.

The players may receive points according to various rules, for example, according to the number of other players' pegs which they take; to the number of flip-flops changed over; the one to SET a certain flip-flop, etc. The game continues until the players cannot make further moves, or until the players' supply of pegs is exhausted. A player's success will depend largely on his ability to analyze the interrelation of the flip-flops imposed by the "programme." The moves of the other players however add an element of chance.

When four play, pairs of players can be partners, as in bridge.

One example of a "programme," suitable for use in the form of game specifically described above, is set forth in the following table:

| Flip-flop | Transfer signals to— | Inhibit |
| --- | --- | --- |
| 1 | 2, 3, 5, 9, 13 | |
| 2 | 3, 4 | 14 |
| 3 | 4, 5, 6, 10, 14 | |
| 4 | 5, 6, 8, 12, 16 | |
| 5 | 6, 7 | 11 |
| 6 | 7, 8, 10, 14, 2 | |
| 7 | 8, 9, 11, 15, 3 | |
| 8 | 9, 10, 12, 16, 4 | |
| 9 | 8, 7, 5, 1, 14 | |
| 10 | 9, 8, 6, 2, 15 | |
| 11 | 10, 9, 7, 3, 16 | |
| 12 | 11, 10 | 6 |
| 13 | 12, 11, 9, 5, 1 | |
| 14 | 13, 12 | 3 |
| 15 | 14, 13, 11, 7, 3 | |
| 16 | 15, 14, 12, 8, 4 | |

The above table will be understood from the foregoing description. For example, let it be assumed that the second player, with red pieces, has filled all holes $a$, $b$, $c$, $d$, $e$ of AND gate RG2 whereby to change the state of flip-flop 2. The "programme" requires the player to remove his pieces from AND gate RG2 and place them on any available holes $a$ to $e$ of AND gates RG3 and RG4, with one piece being placed on the hole $h$ of flip-flop 14, the remaining pieces, if any, being returned to storage. If the second player had set flip-flop 3 he would have moved pieces to AND gates, RG4, RG5, RG6, RG10 and RG14.

Instead of showing the computer "programme" by the panels or boxes P, it may be shown schematically as illustrated in FIGURE 1b. This figure shows the same portion of the board as is illustrated in FIGURE 1a, and shows the same "programme." Each square has a central area divided so as to form a miniature representation of the board, and the signals are directed as shown by the dots in the appropriate divisions, representing signals transferred to the corresponding AND gates, or by the letter I, representing inhibition of the corresponding flip-flop.

In this modification, the INHIBIT hole $h$ may be moved outside the central area: alternatively, inhibition may be represented by a special peg (e.g., a black one) put into a hole $f$ adjacent the flip-flop to be inhibited.

In a further variant form of the game, a portion of the "programme" is left to the decision of the player who has changed over a particular flip-flop. This adds to the chance element in the game. Thus, a flip-flop may indicate a free terminal, for example by X, and a player who has SET such a flip-flop may place his pegs on any field or fields he chooses; similarly, additional pegs may be allowed to simulate an additional signal output of a flip-flop.

It will be appreciated that the game can be simplified by reducing the number of flip-flops, or further complicated by increasing this number. The board can be arranged so that if desired a reduced number of flip-flops, say nine, can be used for play. Pegs form a convenient way of simulating input signals but other means can be used.

Other computer functions may be simulated besides those mentioned above. Thus some of the flip-flops 1 to 16 may have associated therewith indicia representing OR or AND-OR gates, conveniently a set of peg holes identified by a colour different from those for the AND gates GG1 and so forth. These OR or AND-OR gates may be used by any player, and the flip-flop will be set when there are pegs in all the holes. Preferably such gates are associated with flip-flops which direct signals primarily to inhibit other flip-flops.

"Transfer," "Branch," and "Compared" functions could also be simulated by programming of the output from the flip-flops; for example, a player can get an extra peg or other reward if he can set a flip-flop which has an indication "Compared," which refers to comparison with another flip-flop which is already SET; or he may be penalized if that other flip-flop is not SET. Such functions may be indicated by appropriate symbols.

The rules could be changed so that the players obtain equal numbers of pegs, but of random colour.

In their practical application, computers are required to solve problems arising in the normal operations of commerce, science and industry. When a computer is designed and programmed for a given practical application, particular parts of the computer are assigned to particular aspects of the problem to be solved, and can be designated by these particular aspects. The invention contemplates not only simulation of a computer in the abstract, but also simulation, in the form of a game, of a computer as applied to a particular problem.

FIGURE 3 illustrates a board for playing a construction game, in which it is to be assumed that information representing the various building operations is fed to a computer. The game as illustrated is for two players assigned respectively the colours green (G) and red (R), but it will be appreciated that it can readily be modified for more players.

Squares 21, 21a, 21b; 22, 22a, 22b; 23, 23a, 23b; 24, 24a, 24b are arranged in rows on the board and schematically represent flip-flops of the computer. The "21" squares are arranged in a horizontal line and are associated with the operation "clear site." The "22," "23" and "24" squares are also arranged respectively in horizontal lines and associated with the operations "build access road," "bring crane" and "deliver brick." By analogy there may be further horizontal rows of flip-flop-simulating indicia, each row associated with a given building operation.

The middle squares 21, 22, 23, 24 of the various lines form a vertical row and are each associated with two sets of six holes GG21, RG21; GG22, RG22; GG23, RG23; GG24, RG 24; each set of holes simulating an AND gate of the respective flip-flop in the manner described with reference to FIGURE 1, and each hole simulating an input terminal of the gate. In each square, one set of holes, say GG21, is for the "green" player only and the other, say RG21, for the "red" player only, the holes being associated with corresponding colouring on the board. The left hand squares 21a, 22a, 23a, 24a form a vertical row and are each associated with two sets of holes DGA21, PGA21; DGA22, PGA22; DGA23, PGA23; DGA24, PGA24. The right hand squares 21b, 22b, 23b, 24b form another vertical row and are each associated with two sets of holes DGB21, PGB21; DGB22, PGB22; DGB23, PGB23; DGB24, PGB24. Each set of holes DGA21, etc., and DGB21, etc., represents an AND gate as previously described. The sets of holes DGA21, etc., and DGB21, etc., have only three holes, and represent a "direct route." The sets of holes PGA21, etc., PGB21, etc., have six holes and represent a "penalty route." The left hand vertical row of squares 21a, 22a, etc., is used only by the "green" player and the right hand vertical row of squares 21b, 22b, etc., is used only by the "red" player.

The middle squares 21, 22, 23, 24 are marked with consecutive numbers 1, 2, 3, 4, respectively, and carry "programme" representing indicia as follows:

Square 21—3, 4, ARF (="access road flooded")
Square 22—1, 4, WS (="wrong site")
Square 23—1, 2, WB (="wrong brick")
Square 24—2, 3, CC (="crane collapsed")

The players are given equal numbers of pegs of their own colour representing signals to be applied to the gate terminals simulated by the holes, as previously described. Dice are thrown to determine a random initial setting of the flip-flops represented by the middle squares 21, 22, etc. Thereafter the players play in turn. Each has the choice of applying signals to the gates of the left or right hand vertical row of flip-flops, as the case may be, or to the gates of the middle row.

If, say, the "green" player has six pegs in the holes of the AND gate GG21, he sets the flip-flop and removes the pegs of the other player; following the "programme" above-mentioned he then transfers two of his own pegs to holes in AND gates GG23 and GG24 and one to DGB22 to inhibit his opponent's "direct route" gate in the "build access road" line. When a "direct route" gate of the left or right hand vertical row is inhibited the corresponding flip-flop can only be set by use of the "penalty route" gate which, though it cannot be blocked by another player, requires more signals.

In the left and right hand vertical rows each player must set the flip-flops in turn, going downwards. Thus, the left player cannot "build his access road" (set flip-flop 22a) before "clearing his site" (set flip-flop 21a).

Play continues until one player has set all his flip-flops 21a, 22a, 23a, 24a or 21b, 22b, 23b, 24b; that player is the winner.

Once again it will be appreciated that many variants may be contemplated in the representation of the computer elements, as previously discussed. The game just described with reference to FIGURE 3 can be modified to apply to many other problems besides those of the construction industry, for example the art of war, or space exploration.

While the principles of the invention have now been made clear in illustrative embodiments, there will be immediately obvious to those skilled in the art many modifications which can be adopted, e.g., in adapting the computer simulation to different practical problems, without departing from those principles. The appended claims are therefore intended to cover and embrace any such modifications, within the limits only of the true spirit and scope of the invention.

I claim:

1. A game apparatus for simulating the logical progression of signals in a computer comprising
    a game board having lines drawn thereon dividing the surface of said board into at least three fields;
    each of said fields having field identifying indicia uniquely identifying said fields, and each of said fields having at least three groups of differently appearing indicia arranged peripherally thereon;
    at least one indicium visually different from any of the indicia of the groups, and arranged in conjunction with each field, and located separate from said groups of indicia;
    a plurality of playing pieces divided into the same number of groups as said indicia, said playing pieces of any one group being alike and matching the visual aspect of the indicia of one of said groups;
    and a region on each field in which a plurality of indicia are inscribed matching the field-identifying indicia of certain of the other fields.

2. A game apparatus according to claim 1 wherein said board has an additional indicium arranged in conjunction with each field.

3. A game apparatus according to claim 1 wherein the matched visual aspect is obtained by color matching.

4. A game apparatus according to claim 1 wherein the matched visual aspect is obtained by matching of shapes of the playing pieces and the indicia of said groups.

5. A game apparatus according to claim 1 wherein said field-identifying indicia are numbers.

6. A game apparatus according to claim 1 wherein at least one of said regions has associated with at least one of the field designating indicia inscribed therein at least one letter which is the initial letter of a word describing a computer operation.

7. A game apparatus for simulating a computer program wherein computer components of the group comprising AND gates, flip-flops, signal terminals and logic intercommunications are schematically represented, comprising
    a board divided by lines formed thereon into fields, each field including at least three input regions and each input region having a plurality of individual input indicia, the indicia of each region being of distinctively different appearance from those of the other regions;
    at least three groups of playing pieces, the pieces of each group matching the appearance of the indicia of one of said input regions, said pieces being adapted for application to said input indicia; and
    identification means uniquely identifying each field, each of said fields further including a marking defining a logic region, said logic region having indicia matching one or more of said identifying means identifying other fields.

8. A game apparatus according to claim 7 wherein the matching of the appearance of the input region indicia and the playing pieces is color matching.

9. A game apparatus according to claim 7 wherein at least one of said logic region indicia has associated therewith at least one letter forming the initial letter of a word describing a computer operation.

10. A game apparatus for a plurality of players simulating the operation of a digital computer applied to a given practical problem comprising
    a board having a plurality of fields arranged in groups;

each group having two fields of a first type and one field of a second type;

each field having markings defining a central region and a plurality of peripheral regions, each of which peripheral regions is provided with a group of indicia, said indicia being formed by recesses;

said second type fields each having the same number of indicia in each peripheral region, the groups of indicia being visually different, and said first type fields having peripheral regions with different numbers of indicia; and a plurality of groups of playing pieces for insertion by the players into said recesses, the pieces of each group visually matching the recesses in one of the groups of recesses of said second type field.

11. A game apparatus according to claim 1, including an additional indicium arranged in conjunction with each field, said additional indicium being visually different from an independent of any other indicia.

12. A game apparatus according to claim 7, including an additional indicium arranged in conjunction with each field, said additional indicium being visually different from and independent of any other indicia.

13. A game apparatus for simulating the logical progression of signals in a computer comprising a game board having a predetermined outline and having lines drawn thereon dividing said board into at least three fields within said outline;

each of said fields having at least three groups of indicia arranged peripherally thereon, the indicia in each group being of different appearance from those in the other groups;

an indicium visually different from any of the indicia of the groups, and arranged in conjunction with each field, located separate from said groups of indicia;

a plurality of playing pieces divided into the same number of groups as said indicia, said playing pieces of each group being alike and matching the visual aspect of the indicia of one of said groups;

and a region on each field having a pattern placed thereon comprising an outline and dividing lines matching the outline of the board and said lines thereon, and index marks on said pattern matching in their locations relative to the outline and the dividing lines the locations of some of said fields on said board with respect to said outline.

14. A game apparatus according to claim 13 including an additional indicium arranged in conjunction with each field.

15. A game apparatus according to claim 13 wherein the matched visual aspect is obtained by color matching.

16. A game apparatus according to claim 13 wherein the matched visual aspect is obtained by matching of shapes of the playing pieces and the indicia of said groups.

17. A game apparatus according to claim 13 including further indicia inscribed in said pattern in the form of at least one letter which is the initial letter of a word describing a computer operation.

References Cited

UNITED STATES PATENTS

| | | | |
|---|---|---|---|
| 1,592,830 | 7/1926 | Kaplan | 273—135 |
| 3,115,345 | 12/1963 | De Temple et al. | 273—134 |
| 3,169,769 | 2/1965 | Cornish | 273—130 X |

FOREIGN PATENTS 504,003  4/1939  Great Britain.

DELBERT B. LOWE, *Primary Examiner.*